Patented Dec. 26, 1944

UNITED STATES PATENT OFFICE 2,365,729

ACTIVATED CARBON CATALYST BODIES AND THEIR PREPARATION AND USE

Erwin A. Schumacher, Parma, and George W. Heise, Rocky River, Ohio, assignors to National Carbon Company, Inc., a corporation of New York No Drawing. Application November 14, 1941, Serial No. 419,108

13 Claims. (Cl. 23—126)

The invention relates to the art of conducting oxidation-reduction reactions, for instance those involving aqueous solutions of salts of metals of variable valency. More particularly, the invention provides a novel catalyst for such reactions, a novel method for preparing catalysts, and a novel method of conducting reactions of the oxidation-reduction type.

Iron sulfates are typical of the materials to which the invention may be applied, and in the description of the invention reference will most often be made to ferric and ferrous sulfates as examples to illustrate the principles of the invention. That salts of metals other than iron, for instance tin, and salts other than sulfates, chlorides for example, are similarly amenable to oxidation or reduction will be apparent. Further, it will be clear that inorganic compounds other than salts, and also organic materials, may be treated according to the invention.

Ferrous sulfate in acid solution is obtained in very lare quantities as a by-product of several familiar industrial operations, notably including the pickling of iron and steel. The disposal of these ferrous sulfate solutions, amounting as they do to many hundreds of millions of gallons each year, is a serious problem. The market for ferrous sulfate is limited and has not been able to absorb the entire output even at a very low price. Large quantities are neutralized and discarded, but this practice not only wastes materials but is of limited availability because it cannot be carried to the point of unduly polluting streams and ground waters.

Ferric sulfate can be used in large quantities, for instance by steel plants as a special pickle liquor or as a reagent in the preparation of sulfuric acid pickle liquor, by ore processing plants for the preparation of leaching liquor, and by sewage treating plants as a coagulant. Therefore, an efficient and inexpensive method for oxidizing ferrous sulfate to ferric sulfate is desired to convert the troublesome waste ferrous salt to the more useful ferric salt. It is an object of this invention to provide such a method.

It has been recognized that the oxidation of ferrous sulfate in acidulous solution by simple aeration of the solution would be a commercially attractive method if it could be made operable. But attempts to devise a method of this kind have not been successful, because the rate of oxidation is exceedingly slow under the conditions and with the catalysts heertofore proposed.

We have discovered that ferrous salts, as well as other materials including other lower-valency salts of metals of variable valency, may be oxidized when in acidulous aqueous solution by oxygen or a gas containing molecular oxygen, such as air, at a rapid rate in the presence of oxygen-containing carbon in a form having an extensive surface. Such carbon acts as a catalyst of the reaction.

As just indicated, one requirement of the carbon is that it have a highly developed surface, very extensive in relation to its volume. A fairly high development of surface area may be achieved by mere comminution of the carbon, but far greater catalytic effectiveness may be obtained by the use of porous materials such as charcoal, decolorizing carbons, and various vegetable chars. It is generally preferred to develop even greater porosity in such porous materials by the selective oxidation methods used in making "activated" carbons.

Although a highly developed surface is important, the catalytic activity varies widely among carbons of different origins and different histories in a manner which indicates clarly that the development of an extensive surface internally and externally is not the only consideration governing the degree of catalytic activity. Variations have been observed of a hundredfold or more in terms of weight of product per hour per unit weight of carbon, the greater catalytic activity being exhibited, as often as not, by the char of less development of surface. No simple relationship has been found to exist between the vapor adsorption activities and the oxidation-catalytic activities of different chars. The experimental evidence is persuasive that entirely different mechanisms are involved in the two kinds fo activities.

In order to exert the type of catalytic activity useful in oxidations of the kind with which this invention is concerned, the porous carbon must contain oxygen, such as it may acquire by contact with air, or other oxidizing gas (e. g. carbon dioxide or steam) at high temperatures below its ignition temperature in that gas; or as it may acquire by treatment with strong oxidizing agents, for instance nitric or phosphoric acid, at room temperatures or somewhat above; or as it may retain during manufacture from an oxygen-containing raw material such as wood or other vegetable materials.

The catalytic activity of a carbon is not a direct function of its total content of "fixed" oxygen. In fact, no relation has been observed between catalytic activity and total or fixed oxygen; but all of the materials in which we have observed catalytic activity contain some oxygen.

Although no phase of the present invention depends for operability upon theoretical considerations, we suggest as a reasonable hypothesis that the kind of catalytic activity here under discussion depends upon the presence in the carbon of one or more specific oxygen-carbon complexes, that other oxygen-carbon complexes which may exist in the carbon are relatively inert catalytically, and that the variations in catalytic power among different carbons may be caused in large part by differences in their contents of the various complexes. If such working hypothesis be correct, it should be possible to increase the catalytic activity by subjecting the carbon to suitable oxidizing influences and by heating the oxygen-containing carbon within critical temperature limits. We have discovered that such expedients do indeed increase the catalytic activity, in some instances many fold.

More specifically, we have found that heating an oxygen-containing carbon under substantially nonoxidizing conditions, i. e. out of free contact with air or other oxidizing media, at a temperature between 925° and 1000° centigrade, preferably between 945° C. and 975° C., for a time between 5 and 25 hours, preferably 10 to 18 hours within the preferred temperature range, markedly enhances the catalytic activity of the carbon in the type of oxidation-reduction reactions discussed above. Accordingly, the invention includes a method of treating catalytically active carbon which comprises the foregoing heat treatment, and also includes a catalyst body essentially comprising carbon having a highly developed surface and being in the catalytically active condition induced by such treatment.

As we have suggested above, numerous commercially available carbons contain some oxygen. Mere heat treatment at 925° to 1000° C. enhances the catalytic activity of such carbons. In most instances, however, even greater catalytic powers may be attained if, prior to the heat treatment, a low-temperature partial oxidizing treatment is employed. Such an oxidizing treatment may also be used, in conjunction with the heat treatment, to impart catalytic power to carbon materials which otherwise are relatively inert catalytically.

One suitable oxidizing treatment comprises treating a porous carbon with a solution of nitric acid, chromic acid, ferric sulfate, or other oxygen-containing strongly oxidizing acid or salt. Alternatively, or additionally, the carbon may be heated in air at a temperature between 200° C. and its ignition temperature, the latter varying, of course, with such factors as ash content and prior thermal treatment. For a carbon with an ignition temperature in air in the neighborhood of 450° C., a suitable temperature for air oxidation would be about 300° C. The air oxidation may suitably be continued until a total weight loss of 10% to 35% of the carbon has occurred.

When used as an oxidation catalyst, the carbon may be brought into effective contact with the reactants in any of a number of ways. For instance, in a batch process, the carbon may be suspended in the liquid and air or oxygen then bubbled through the suspension; or air or oxygen may be diffused into the liquid through a diffuser composed of the carbon in a bonded or agglomerated diffuser mass; or both of these expedients may be used. The foregoing procedures are quite suitable for use in those instances where the reaction is readily catalyzed or where the catalyst is very active, or both, or where initial turbidity makes it undesirable to pass the solution through a column or tower packed with granular catalytic carbon.

A method adaptable to continuous operation as well as to batch operation which can be used effectively to effect high percentages of conversion of reactants even in reactions which are difficult to catalyze and with carbons of the lesser catalytic activities, comprises passing the liquid and the gas concurrently down through a tower packed with granules of catalytically active carbon. The pressure drop through such a packed tower is low enough to permit the use of inexpensive blowers for the air, and as a consequence a considerable excess of air, say several times the theoretical requirement of the reaction, may be used without materially affecting the cost of the process. A large excess of air insures that the supply of oxygen will not limit the rate of conversion of the material being oxidized.

The practicability of the invention has been demonstrated both in the laboratory and on a commercial scale of operation. The following table sets forth experimental data that illustrate the conversion rates obtainable through the use of various typical kinds of catalytically active carbon in the air oxidation of acidulous solutions of ferrous sulfate. These data were obtained as a result of tests conducted under conditions which were similar except for the kind of catalyst. In each test, the ferrous sulfate solution contained, aside from water, 69.8 grams of ferrous iron per liter, less than 0.5 gram of ferric iron per liter, and 65 grams of sulfuric acid per liter. The carbons were crushed and sized to pass a 35 mesh screen (about 0.417 mm. openings) and remain on a 65 mesh screen (about 0.208 mm. openings), were wetted with ferrous sulfate solution, and were packed into towers to form columns 28 inches high by 1.25 inch in diameter. Air was passed down each column at a rate of about 250 cc. per minute, and ferrous sulfate solution at room temperature was passed down the column at a rate that resulted in a conversion of 80% by weight of the ferrous iron to ferric iron. The catalytic effectiveness was then calculated as grams of iron oxidized per hour per pound of carbon. In the table, the values in columns A and B represent respectively the catalytic effectiveness of the material before and after heat treatment at 950° C. in a closed container ("950° calcine").

| Type of carbon | Catalytic effectiveness, grams Fe per hr. per lb. carbon | |
|---|---|---|
| | A. Before 950° calcine | B. After 950° calcine |
| Commercial char ("Nuchar") derived from sulfite liquor residues | <0.1 | 4.0 |
| Commercial char ("Norit") derived from wood | 0.4 | 4.0 |
| Commercial char ("Darco") derived from lignite | 1.8 | 6.8 |
| Hardwood charcoal | Nil | <0.1 |
| Hardwood charcoal oxidized in $CO_2$ at 900° C. to 37% loss | 3.9 | 7.2 |
| Coconut charcoal | Nil | <0.1 |
| Coconut charcoal oxidized in $CO_2$ at 950° C. | 7 | 9 |
| Coconut charcoal oxidized in steam at 875° C. | 0.5 | 3.6 |
| Coconut charcoal calcined at 950° C., air oxidized at 300° C.[1] | 0.1 | 4.0 |
| Coconut charcoal exhibited in $CO_2$ at 950° C., air oxidized at 350° C.[1] | 2.6 | 11.0 |
| Hardwood sawdust heated with $ZnCl_2$, calcined at 600° C. | 0.5 | 14.8 |
| Hardwood sawdust heated with $ZnCl_2$, air-oxidized at 300° C., then calcined at 600° C. | | 20 |

[1] Air oxidation carried to about 15% loss in weight of the carbon.

The oxidation of coconut charcoal in $CO_2$ at 950° C., mentioned in the foregoing table, was effected by the method described in Patent 2,180,735, V. C. Hamister, issued November 21, 1939. Zinc chloride treatments of sawdust are well known in the art, for instance in Patent 2,083,303, Krczil.

It will be observed that calcining at 950° C.

or thereabout induces a useful degree of catalytic effectiveness in chars made of relatively inexpensive materials by relatively simple processes, while the initially fairly high effectiveness of the more expensive chars such as activated coconut shell charcoal and chemically activated wood char is enhanced to an extremely high degree.

Conversions of ferrous to ferric iron better than 99% can readily be obtained, but at the expense of a decreased output per hour per pound of carbon. In general, higher oxidation rates are favored by higher temperature, by higher partial or total pressure of oxygen, and by high ferrous iron concentration and high ratio of ferrous to ferric iron in solution, while oxidation rates are adversely influenced by high acidity. In a typical instance, increasing the temperature from 25° C. to 60° C. increased the oxidation rate by 30%; raising the pressure to 5 lb./sq. in. gage increased the oxidation rate by 35% of that at atmospheric pressure; while at 60° C. and 5 lb./sq. in. gage the oxidation rate was over two and one-third times the oxidation rate at 25° C. and atmospheric pressure.

The oxidation of ferrous iron in solution will take place even when there is considerably less than the theoretical amount of sulfuric acid to meet the equation:

$$2FeSO_4 + H_2SO_4 + O_2 \rightarrow Fe_2(SO_4)_3 + H_2O$$

We have experimentally oxidized to a high percentage of conversion ferrous sulfate solutions containing less than half of the theoretical sulfuric acid. But the basic ferric sulfate so formed is readily precipitated from solution upon standing or when heated, and such precipitation would be detrimental if it occurred in a tower packed with carbon. Accordingly, it is usually preferred that the sulfuric acid content of the solution be not far less or more than the theoretical requirement indicated by the foregoing equation. In practice, the acid concentration can usually be held within the desired limits by mixing acidulous solutions of different acidities from different sources, or by adding some acid when necessary.

The air oxidation of acidulous solutions of ferrous sulfate has been chosen for detailed and extended description herein, partly because of the urgency and importance of the industrial problem presented by such solutions and partly because the principles of the invention can be well illustrated by showing their application to that particular problem. But the invention is not limited to the treatment of iron solutions. By suitably varying the operating conditions in ways which will be apparent to those skilled in the art or which can be determined by routine experimentation, the broadly novel principles of the invention can be applied to a very wide variety of oxidation-reduction reactions amenable to catalysis by catalytically active carbons.

We claim:

1. Method of oxidizing an oxidizable fluid material which comprises contacting molecular oxygen with said fluid material in the presence of activated carbon in the catalytically active state produced by prolonged calcining, after activation, at temperatures between 925° and 1000° C. under conditions excluding air, steam, carbon dioxide and all other oxidizing media.

2. Method of oxidizing a ferrous salt in solution which comprises contacting molecular oxygen with said solution in the presence of activated porous carbon in the catalytically active state produced by prolonged calcining, after activation, at temperatures between 925° and 1000° C. under conditions excluding air, steam, carbon dioxide and all other oxidizing media.

3. Method of oxidizing ferrous sulfate in acidulous aqueous solution which comprises passing such solution and molecular oxygen over a catalyst essentially comprising activated vegetable charcoal in the catalytically active state produced by prolonged calcining, after activation, at temperatures between 925° and 1000° C. under conditions excluding air, steam, carbon dioxide and all other oxidizing media.

4. Method of oxidizing ferrous sulfate in acidulous aqueous solution which comprises passing such solution and air concurrently through a catalyst of oxygen-containing activated vegetable charcoal in the catalyically active state induced by long heating, after activation, under substantially nonoxidizing conditions excluding air, steam, carbon dioxide, and all other oxidizing media at temperatures in the neighborhood of 945° to 975° C.

5. Method of oxidizing a ferrous salt in solution which comprises passing such solution and a gas containing molecular oxygen concurrently through a catalyst body essentially comprising an activated vegetable charcoal in the catalytically active state produced by prolonged calcining, after activation, at temperatures between 925° and 1000° C. under conditions excluding air, steam, carbon dioxide and all other oxidizing media.

6. Method of reacting a gas with a liquid which comprises passing such gas and liquid concurrently through a catalyst body of activated carbon in the catalytically active state produced by prolonged calcining, after activation, at temperatures between 925° and 1000° C. under conditions excluding air, steam, carbon dioxide and all other oxidizing media.

7. In a method of preparing a carbon catalyst body the steps of partially oxidizing a porous carbon char in an oxidizing medium at a temperature below its ignition temperature in such medium, and thereafter heating the carbon under substantially nonoxidizing conditions excluding air, steam, carbon dioxide, and all other oxidizing media at a temperature exceeding 925° C.

8. In a method of preparing a carbon catalyst body the steps of partially oxidizing a porous vegetable charcoal in an oxidizing gas at a temperature above 200° C. but below its ignition temperature in such gas, and thereafter heating the carbon under substantially nonoxidizing conditions excluding air, steam, carbon dioxide, and all other oxidizing media for between 5 and 25 hours at a temperature between 925° C. and 1000° C.

9. In a method of preparing a carbon catalyst body the steps of oxidizing a porous vegeteable charcoal, to a weight loss of between 10% and 35% of the charcoal, in air at a temperature between about 200° C. and about 450° C. but below the ignition temperature of the charcoal, and thereafter heating the carbon under substantially nonoxidizing conditions excluding air, steam, carbon dioxide, and all other oxidizing media for 10 to 18 hours at a temperature between 945° C. and 975° C.

10. In a method of preparing a porous oxygen-containing carbon catalyst for use in catalyzing the reaction between molecular oxygen and a ferrous salt in acidulous aqueous solution, the step of improving the catalytic effectiveness of said catalyst in such reaction which comprises heating the catalyst under substantially nonoxidizing conditions excluding air, steam, carbon dioxide, and all other oxidizing media at a temperature in the neighborhood of 945° to 975° C. for at least 5 hours.

11. A catalyst body essentially comprising oxygen-containing activated carbon having a highly developed surface and being in the catalytically active state induced by extended heating under nonoxidizing conditions excluding air, steam, carbon dioxide, and all other oxidizing media at a temperature between about 925° C. and about 1000° C.

12. A catalyst body essentially comprising activated carbon having a highly developed surface, containing oxygen and being in the catatylically active state induced by low temperature oxidation and subsequent extended heating between 5 and 25 hours at a temperature between about 925° C. and about 1000° C. under conditions excluding air, steam, carbon dioxide, and all other oxidizing media.

13. A catalyst body essentially comprising activated vegetable charcoal containing oxygen in a form producible by heating the charcoal in air at a temperature between 200° C. and its ignition temperature, and being in the catalytically active state induced by heating, under conditions excluding all oxidizing media between 10 and 18 hours at a temperature between 945° C. and 975° C.

GEORGE W. HEISE.
ERWIN A. SCHUMACHER.